US012760776B2

(12) United States Patent
Bowden

(10) Patent No.: US 12,760,776 B2
(45) Date of Patent: Oct. 13, 2026

(54) BRAKING DEVICE WEAR INDICATOR AND METHOD

(71) Applicant: Transportation IP Holdings, LLC, Norwalk, CT (US)

(72) Inventor: A Gary Bowden, Laurinburg, NC (US)

(73) Assignee: Transportation IP Holdings, LLC, Norwalk, CT (US)

( * ) Notice: Subject to any disclaimer, the term of this patent is extended or adjusted under 35 U.S.C. 154(b) by 654 days.

(21) Appl. No.: 17/507,534

(22) Filed: Oct. 21, 2021

(65) Prior Publication Data

US 2023/0030390 A1 Feb. 2, 2023

Related U.S. Application Data

(60) Provisional application No. 63/226,578, filed on Jul. 28, 2021.

(51) Int. Cl.
*F16D 66/02* (2006.01)
*F16D 65/06* (2006.01)

(52) U.S. Cl.
CPC ............. *F16D 66/02* (2013.01); *F16D 65/06* (2013.01)

(58) Field of Classification Search
CPC ....................................................... F16D 65/06
See application file for complete search history.

(56) References Cited

U.S. PATENT DOCUMENTS

| | | | | |
|---|---|---|---|---|
| 557,699 | A * | 4/1896 | Pirch | |
| 3,611,283 | A | 10/1971 | Anders et al. | |
| 3,662,863 | A | 5/1972 | Dombeck | |
| 5,139,114 | A | 8/1992 | Rodriguez et al. | |
| 5,893,434 | A | 4/1999 | Walker et al. | |
| 6,311,554 | B1 | 11/2001 | Walpole | |
| 7,066,302 | B1 | 6/2006 | Talbert | |
| 2003/0234142 | A1* | 12/2003 | Shute | F16D 65/062 188/250 B |
| 2005/0252727 | A1 | 11/2005 | England et al. | |
| 2012/0090953 | A1* | 4/2012 | Cieplak | B65G 11/026 29/428 |
| 2013/0008748 | A1 | 1/2013 | Lembach et al. | |
| 2014/0166410 | A1* | 6/2014 | Boyle | B60T 17/22 188/1.11 W |
| 2019/0063532 | A1 | 2/2019 | Sato et al. | |

FOREIGN PATENT DOCUMENTS

| | | | |
|---|---|---|---|
| AU | 764419 | B2 * | 8/2003 |
| DE | 1020017008824 | A1 * | 6/2018 |

(Continued)

OTHER PUBLICATIONS

RU-158605 English Machine Translation (Year: 2016).*

(Continued)

*Primary Examiner* — Melody M Burch
(74) *Attorney, Agent, or Firm* — K&L Gates LLP

(57) ABSTRACT

A brake shoe includes a backing plate, a composition friction material forming a brake pad. The brake pad has first and second opposite ends and first and second opposite lateral sides. A wear indicator is formed in at least one of the ends. The wear indicator extends outwards from at least one of the first end surface, the second end surface, the first lateral side surface, and the second lateral side surface at a set vertical position with respect to the back surface.

7 Claims, 6 Drawing Sheets

(56) References Cited

FOREIGN PATENT DOCUMENTS

| | | | | | |
|---|---|---|---|---|---|
| JP | 2019044782 | A | * | 3/2019 | ............ B60T 17/228 |
| RU | 2427491 | C1 | | 8/2011 | |
| RU | 157868 | U1 | | 12/2015 | |
| RU | 157918 | U1 | | 12/2015 | |
| RU | 158605 | U1 | | 1/2016 | |
| RU | 2601768 | C1 | | 11/2016 | |
| RU | 173155 | U1 | | 8/2017 | |
| RU | 173184 | U1 | | 8/2017 | |
| RU | 173547 | U1 | | 8/2017 | |
| RU | 175071 | U1 | * | 11/2017 | |

OTHER PUBLICATIONS

RU-157868 U1 English Translation (Year: 2015).*

International Union Of Railways, Appendix C to UIC Code, Leaflet 541-04, 4th edition, Oct. 2014, Brakes—Regulations concerning the manufacture of brake components Self-adjusting load-proportional braking system and automatic “empty-loaded” control device; Appendix C Self-adjusting load-proportional braking equipment accepted in International traffic; Last update Jan. 2, 2019 (4 pages).

International Union Of Railways, Appendix D to UIC Code, Leaflet 541-04, Appendix to the 3rd edition of the leaflet (Nov. 2006); Brakes—Regulations concerning the manufacture of brake components—Self-adjusting load-proportional braking system and automatic “empty-loaded”; Last update Jan. 3, 2014 (3 pages).

International Union Of Railways, Appendix E to UIC Code, Leaflet 541-04, Appendix to the 3rd edition of the leaflet (Nov. 2006); “Brakes—Regulations concerning the manufacture of brake components—Self-adjusting load-proportional braking system and automatic “empty-loaded” control device”; Last update Jan. 11, 2007 (4 pages).

International Union Of Railways, Appendix M to UIC Code, Leaflet 541-4, 6th edition, Nov. 2020, “Brakes: Brakes with composite brake blocks—General conditions for the certification of composite brake blocks”, Last update Sep. 7, 2021 (13 pages).

International Union Of Railways, Appendix to N UIC Code, Leaflet 541-04, 5th edition, Nov. 2018, “Brakes: Brakes with composite brake blocks—General conditions for the certification of composite brake blocks”, Last update Jul. 20, 2020 (3 pages).

Office Action mailed Jun. 30, 2023 for corresponding Kazakhstan application No. 2022/0416.1 (6 pages).

Examination Report mailed Jan. 8, 2024 for corresponding Australian Application No. 2022205278 (6 pages).

* cited by examiner

BRAKING DEVICE WEAR INDICATOR AND METHOD

CROSS-REFERENCE TO RELATED APPLICATIONS

This application claims priority to U.S. Provisional Application No. 63/226,578, which was filed on 28 Jul. 2021, and the entire disclosure of which is incorporated herein by reference.

BACKGROUND

Technical Field

Embodiments of this invention relate to wear indicators for brake shoes, brake pads, and related methods.

Discussion of Art

Some vehicles use brake systems to slow or stop. A driver or operator may apply a brake by pressing on a brake pedal or pulling a brake lever. When applied, the brake system may slow down or stop the vehicle by use of friction on a rotating surface. Vehicles may use one or both of various types of brakes. Existing types of mechanical brakes or friction brakes may be disc brakes and drum brakes.

A pad and a rotor or a shoe and a drum configuration may be used. The pad or shoe (made of a friction material) may be connected to the vehicle, and during use can be pressed against a metal rotor or drum attached to a rotating axle or wheel. As the friction material presses against the rotating part friction generates heat and the vehicle decelerates. Existing friction material may be selected with reference to factors such as cohesive strength, friction co-efficient and heat tolerance. Other factors that may be used in selection include hardness, abrasiveness, moisture resistance, cost, manufacturability, the effect on the corresponding contact surfaces and more. One aspect is to have the friction material wear away in preference to a more-expensive rotating metal rotor or drum.

The ablative friction material is sacrificial, as it is intended to be ablated or slowly used up during repeated braking applications. In the process of using up the friction material there is a finite amount of friction material to be used before it is worn through. Wear-through of a brake pad may result in undesirable metal-to-metal contact and may affect the performance of the braking system. Various industries have realized a need for reliable indication of an impending wear-through. And, naturally, pre-mature change of a brake pad increases overall operating costs.

There are several types of brake pads. For example, there are semi-metallic pads that contain metal or graphite mixed with inorganic fillers and friction modifiers for bonding. Non-asbestos organic pads have a mixture of non-asbestos fibers with filler materials and high-temperature resins. Low-metallic pads may have an organic formula mixed with metal. The metal component may aid with heat transfer and braking performance. Ceramic pads may have ceramic fibers, non-ferrous filler materials, bonding agents and possibly small amounts of metal. These types of pads differ in durability, heat transfer, wear, noise, dust emission and their effect on other parts of the system, such as rotors. Some brake pad or shoe material may be a matrix of tough aramid fibers, friction particles and heat resistant hardening resin.

With regard to existing wear indicators, direct measuring brake wear indicators may be grooves or rivet holes cut in the pads or shoes that require partial or complete disassembly of the braking system to indicate wear level. The equipment, expertise, time and expense involved in maintaining such systems have reduced their desirability. Some indirect measuring brake wear indicators do not measure the remaining brake thickness but measure only the distance between the metal braking plate and the metal rotor or drum.

Another approach to wear indication has been to provide a color layer brake wear indicator. That is, the pad or shoe is made in layers of contrasting colors. The major working thickness of the pad is a standard ablative friction material that sheds brake dust. The bottom reserve or "replacement zone" of the pad is made of a contrasting colored material that functions as an indicator by shedding colored brake dust. This may be visible upon inspection or may even be noticeable with casual inspection of a wheel and rim.

Owing to the nature of the working environment, colored solutions may have difficulty with visibility and other challenges. One alternative approach to the use of color has been to make a simple notch or groove that is cut into an existing pad or shoe. Several Russian Patents illustrate a notch, groove or cut into a pad or shoe, see for example, RU158605U1, RU2601768C1, RU157918U1, and RU173547U1 all filed between 2010 and 2017 and all of which use a low-tech approach that had existed for decades prior to the filing dates. As one example, the European UIC Code 541-4 from 2007 illustrated that for Brakes with Composite Blocks an opening or groove is cut in the side of the brake shoe adjacent to the backing plate to function as a wear indictor. Drawings in the 2007 UIC appendix illustrate an embodiment shown in RU2427491C1.

Due at least in part to undesirable aspects in existing wear indicator designs new features for indicating wear in brake pads or shoes may be desirable.

BRIEF DESCRIPTION

In one embodiment, a brake shoe is provided that includes a backing plate adapted to interface with a brake head on the railway vehicle that has at least one wheel, a composition friction material forming a brake pad that has i) a back surface disposed onto the backing plate and a brake surface of the brake pad for engaging the wheel of the railway vehicle, the brake pad having first and second opposing (or opposite) ends and first and second opposing (or opposite) lateral sides, each of the ends and each of the sides having a respective surface; and at least one wear indicator formed in at least one of the two opposing ends proximate to an intersection of the back surface and at least one of the first end surface, the second end surface, the first lateral side surface and the second lateral side surface, and the wear indicator extends outwards from at least one of the first end surface, the second end surface, the first lateral side surface and the second lateral side surface at a set vertical position with respect to the back surface.

DETAILED DESCRIPTION

Figure 1:
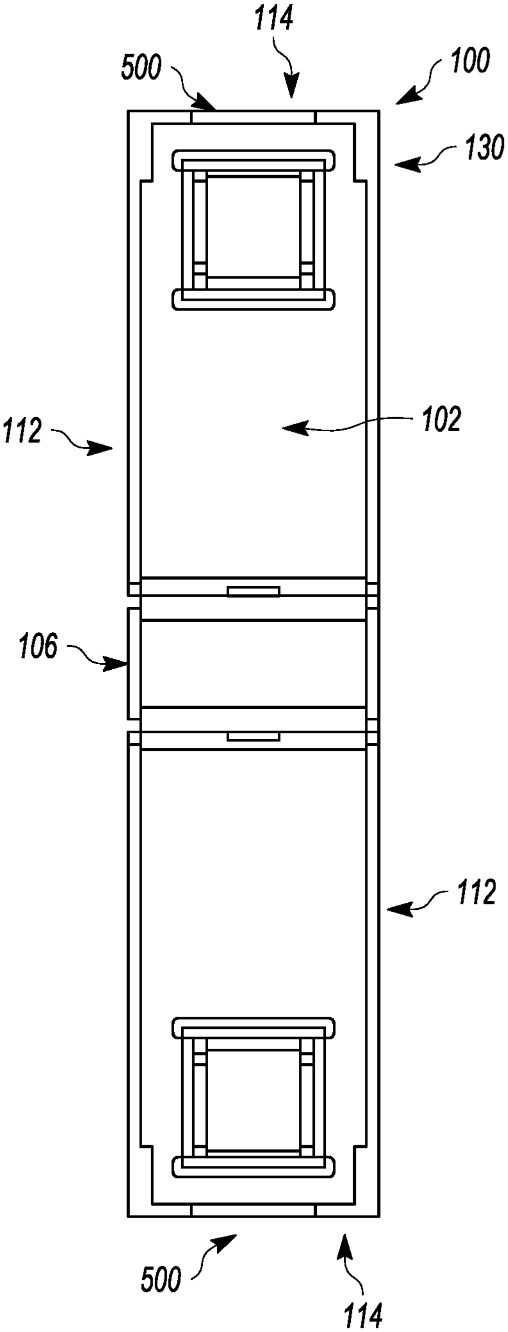
FIG. 1 is a top view of a brake shoe according to an embodiment of the invention.
Figure 2:
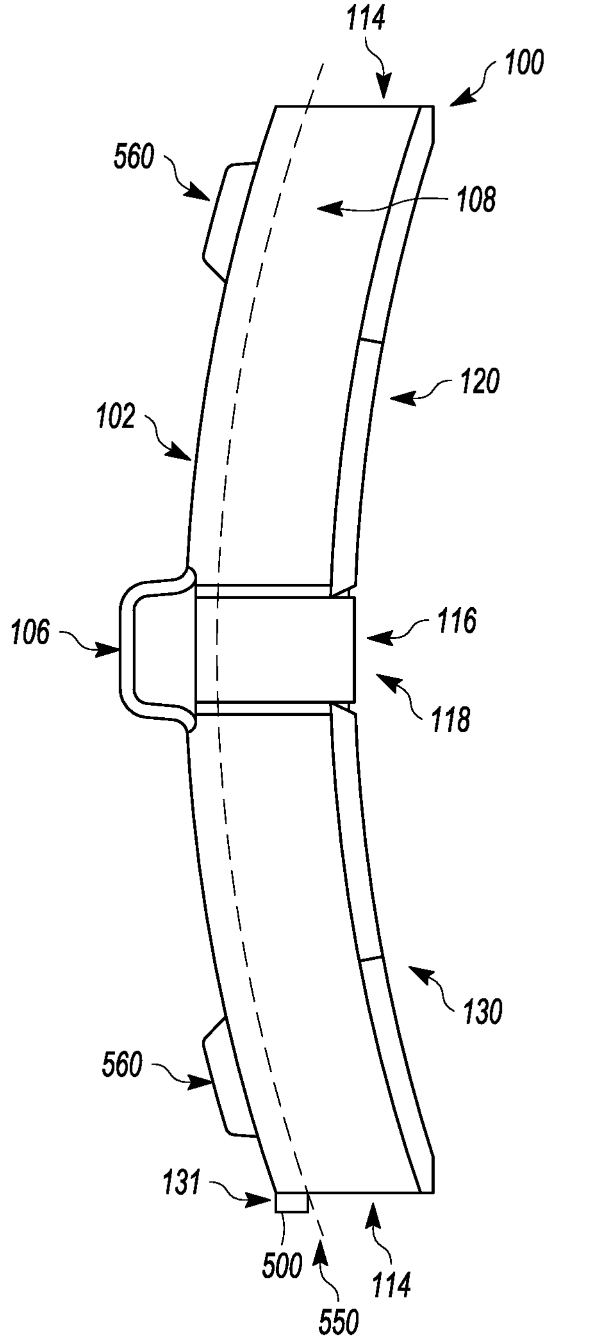
FIG. 2 is a side view of the brake shoe shown in FIG. 1.
Figure 3:
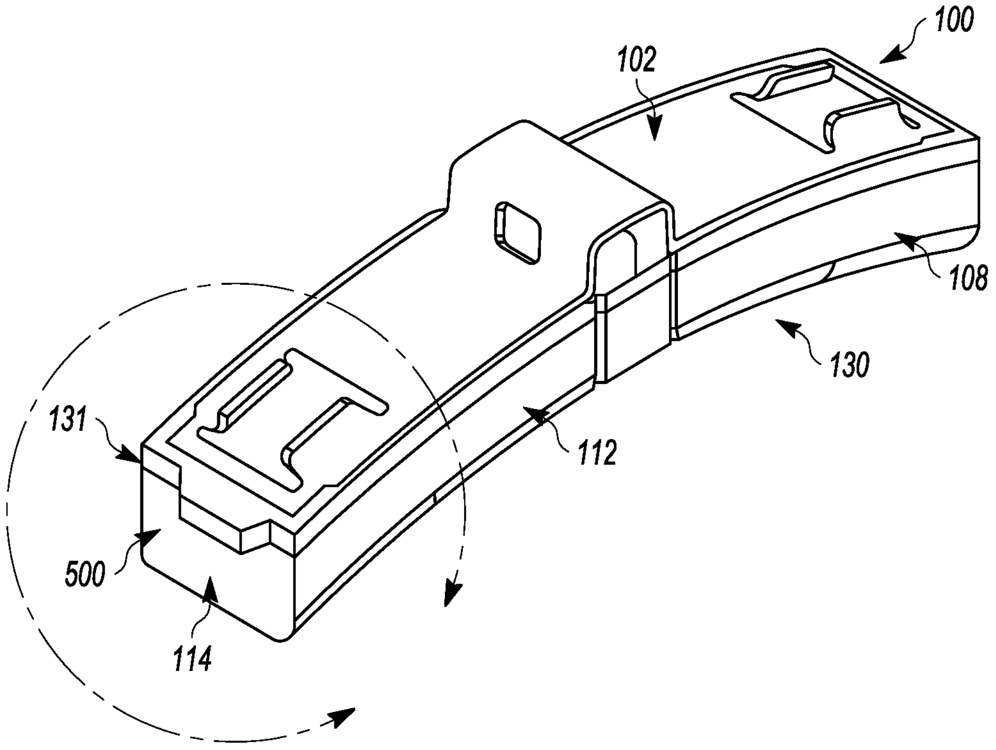
FIG. 3 is a perspective view of the brake shoe shown in FIG. 1.
Figure 4:
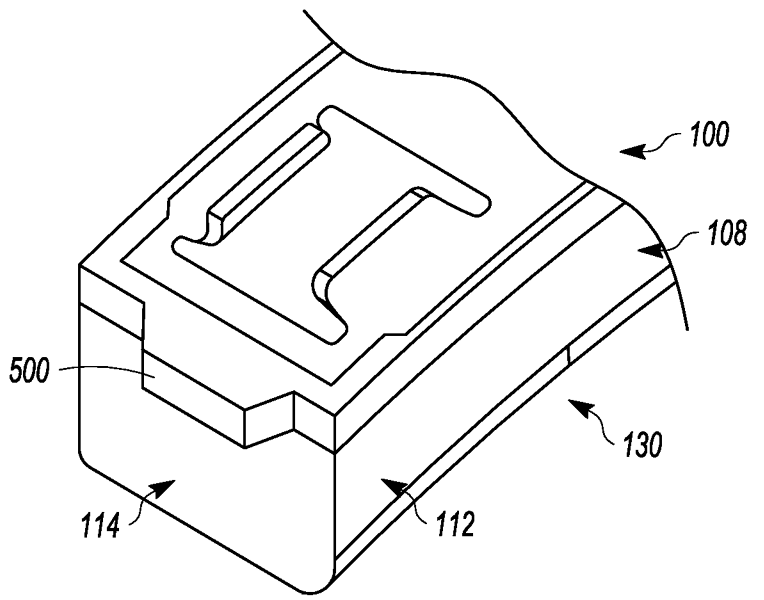
FIG. 4 is an enlarged partial view of the brake shoe shown in FIG. 3.

Embodiments and aspects of this disclosure relate to a wear indicator for a braking device. In particular embodiments, projecting wear indicators may provide a different, and relatively superior, visual indicia of the state of wear for a brake pad or brake shoe. Embodiments of the present disclosure relate to a composition brake shoe with a particular configuration for use on a vehicle. Some embodiments may include composition brake shoes having additional functionality, such as for reconditioning a wheel tread surface during normal brake operation on a vehicle. Some embodiments disclosed and described herein are specific to automobile brakes, while other are specific to rail vehicle brakes, and others may be for other vehicle types. In some instances, features may be applied from one vehicle type to another however the braking systems of various vehicles are generally not transferrable from one vehicle type to another. The mass of the vehicle, for example, is substantially different from an automotive application to a rail vehicle application and the braking forces are correspondingly different. The actuation systems tend to differ greatly by vehicle type, the materials used, the life expectancy, and so on are all different. The standards for testing and evaluation also differ as they account for the aforementioned differences.

In one embodiment, a brake shoe is provided for use on a railway vehicle. This brake shoe may include a backing plate adapted to interface with a brake head on the railway vehicle, and a composition friction material having a back surface disposed onto the backing plate. The composition friction material may define a brake or contact surface of the brake shoe for engaging the wheel of the railway vehicle. The composition friction material may have two opposing ends and two opposing lateral sides and at least one wear indicator. The wear indicator may be formed in at least one of the two opposing ends. In one embodiment, it is disposed at an intersection of the back surface and at least one of the opposing ends and extends outward from at least one surface of one end. Embodiments with various wear indicators and alternative brake shoe components are disclosed in more detail hereinbelow.

Suitable composition friction material that forms the brake pad may include traditional and known friction materials as well as novel friction materials. Traditional and known friction materials may include semi-metallic pads that contain metal or graphite mixed with inorganic fillers and friction modifiers for bonding; non-asbestos organic pads that have a mixture of non-asbestos fibers with filler materials and high-temperature resins; low-metallic pads that may have an organic formula mixed with metal; ceramic pads that may have ceramic fibers, non-ferrous filler materials, bonding agents and possibly small amounts of metal; and some may be a matrix of aramid fibers, friction particles and heat resistant hardening resin. Other suitable composition friction materials may include novel low dust materials. In one embodiment, the friction composition material includes plural materials. Using plural materials allows for control over performance, life, and dust creation/emissions.

With regard to the friction composition material, it is important to use test procedures that correspond with the end use application. That is, a rail vehicle needs to use a rail test standard and an automobile needs to use an automobile test standard. Using improper test standards will result in improper readings that will not comply with relevant agency regulations. Using ISO 6310 for automotive applications for the testing method of compressibility, suitable friction composition materials may have a compressibility in the range of less than about 0.005, in a range of from about 0.005 to about 0.006, in a range of from about 0.0061 to about 0.01, in a range of from about 0.01 to about 0.0125, or in a range that is greater than about 0.0126. Testing of samples with a crosshead speed in a range of from about 5 mm/min to about 15 mm/min, with a max force of up to about 45 kiloNewtons (kN), which is equivalent to 9.375 MPa based on a cross section of about 48 square centimeters may provide an average compressibility of about 0.88% (or 0.0088), at a maximum applied pressure of 9.375 MPa; an average compressibility of about 0.75% (or 0.0075), at a maximum applied pressure of 8 MPa; and an average compressibility 0.57% (or 0.0057), at a maximum applied pressure of 3 MPa in one embodiment. It is significant to note that the maximum applied pressure resulted in different compressibility values. The automotive brake test standard runs from 3 MPa (for drum brake linings) to 8 MPa (for commercial vehicle brakes). It is further significant to note that different brake types and different end uses have different associated test pressures. For reference, commercial vehicle drum brakes are tested at about 5 MPa under the ISO 6310 standard. Switching to rail vehicle applications using rail brake systems, a suitable test pressure differs from the ISO 6310 standard's minimum and is around 2 MPa. In one embodiment, suitable friction composition material may be tested at less than 3 MPa and may have a compressibility ratio in a range of less than about 0.006 (0.60%), in a range of from about 0.0059 (0.59%) to about 0.0055 (0.55%), in a range of from about 0.0054 (0.54%) to about 0.0050 (0.50%), in a range of 0.0049 (0.49%) to about 0.0040 (0.40%), or in a range of less than about 0.0039 (0.39%). These values may vary depending on the load rate, but a suitable load rate (unless specified otherwise by a particular end use application) may be less than about 15 mm/min under standard conditions.

With reference to FIGS. 1-4, a brake shoe 100 for use on a railway vehicle is disclosed. The brake shoe may include a backing plate 102 that can interface with a brake head on the railway vehicle. In some other embodiments, the backing plate may include a flange, not shown in this embodiment, that is adapted to align the brake shoe on a wheel of the railway vehicle. The brake shoe may include a keybridge 106 connected to the backing plate. The keybridge may secure the brake shoe to the brake head of the railway vehicle. The brake shoe may include a composition friction material that forms a brake pad 108 and which has a brake surface 110. The brake pad may be disposed on the main body part and may have two opposing lateral sides 112 and two opposing ends 114. Optionally, an intermediate adhesion layer (not shown) may be included to improve adhesion of the composition friction material of the braking pad to the backing plate. The backing plate may include a main body part 130. The brake pad may be disposed onto the backing plate at a back surface 131 of the main body part.

Examples of a suitable brake shoe may include an optional tread conditioning insert 116. The insert may be disposed within the brake pad. In the illustrated embodiment, the conditioning insert is centrally located single insert as has been routinely and historically practiced in the rail industry worldwide for many decades. The conditioning insert may have a wheel conditioning surface 118 that defines a working surface 120 in conjunction with the brake surface of the brake shoe. Together, they may contact the disk, rotor or wheel during braking operations. During use, a technician or observer may determine whether a desired thickness of brake pad remains attached to the main body part of the backing plate of the brake shoe. For convenience, only one type of brake is shown and described in detail, however multiple brake types may benefit from the inventive process shown herein to include disk brakes, drum brakes, and the like.

If present, a suitable intermediate adhesion layer (not shown) may differ from the composition friction material. One or more additional adhesive layers may be used to improve adherence of the composition friction material to the backing plate. In one embodiment, the adhesion layer may be flexible and compliance to provide adhesion in the event of relevant movement between the brake pad and backing layer while maintaining its adhesion. An adhesion layer may be a disposed as a continuous layer, or may be discretely located in one or more areas. If spot application is selected, the disposition locations may be based, at least in part, on high stress areas to supplement and enhance the bonding.

In one embodiment, the brake shoe may include at least one wear indicator 500. A suitable wear indicator may be formed across at least a portion of the width of at least one of the two opposing ends at an intersection of the back surface and the brake pad at the opposing end or across at least a portion of one or more of the lateral sides of the brake pad. Examples of the wear indicator may span just a portion of the width of the opposing end (or side). Alternatively, they may span the entire width of the opposing end (or side). One or more wear indicators may be formed on the brake shoe. In one embodiment, the wear indicator may extend a portion of the width of the main body part at the opposing end and be beveled or polygonal while extending outward (as shown) or may be rounded (not shown) or may be coved—inward or outward—as the protruding wear indicator meets up with the main body of the brake pad.

In one embodiment, at least one wear indicator intersects a lateral side of the brake shoe in a position that is observable by a technician without removal when the brake shoe while it is installed in a brake system on a vehicle.

A suitable wear indicator may have a height and a depth and may extend relative to the brake pad to define a set vertical position with respect to the back surface. The wear indicator should extend sufficiently to allow a technician to observe, by comparison, whether a desired thickness (i.e., height) of brake pad remains on the brake shoe. In examples, the depth to which the wear indicator extends into the opposing end of the brake pad may be sufficient to allow a technician to observe, by comparison, whether a desired thickness (i.e., height) of brake pad remains on the brake shoe. A technician may view the height of brake pad remaining on the main body part of the brake shoe. In examples, the height and depth of the wear indicator together may allow a technician to judge the thickness of remaining brake pad on the main body part of a brake shoe when examining the brake shoe from an opposing end on which the wear indicator is disposed. In examples, the set vertical position to which the wear indicator extends may correspond to at least the condemning limit of brake pad. As used herein, a condemning limit is the minimum thickness of brake pad desired on the brake shoe's working surface. The wear indicator may be centered on the opposing end between the two opposing lateral sides.

Suitable dimensions for the wear indicator may be in a range of from about 2 millimeters wide to about 100 millimeters wide. In one embodiment, the wear indicator may be about 40 millimeters wide. The wear indicator may extend a distance in a range of from about 1 millimeter to about 50 millimeters from the back surface. In one embodiment, the wear indicator may extend about 10 millimeters from the back surface. In another embodiment, the wear indicator may extend at least about 5 millimeters relative to the at least one opposing end of the brake pad. In one embodiment, the wear indicator may extend 5 millimeters in depth relative the at least one side wall surface of the brake pad. In one embodiment, suitable plural wear indicators may extend, relative to a brake pad surface, by amounts that differ from each other. In other embodiments, the wear indicator may extend more than about 10 millimeters from the back surface and may extend at least 5 millimeters relative to the at least one opposing end surface of the composition friction material. The wear indicator may extend about 10 millimeters from the back surface. The wear indicator may extend at least 5 millimeters in relative to the at least one opposing end of the brake pad. The wear indicator may extend 5 millimeters in relative to the at least one opposing end of the brake pad. In various embodiments, the wear indicator may be at least about 20 millimeters wide and not more than 74 millimeters wide. The set vertical position with respect to the back surface may be a condemning limit. That is, the set vertical position may correspond to a condemning limit such that once the brake pad has worn down to be flush with the wear indicator as a result of it being used to brake the vehicle to which it is attached the brake pad should be replaced.

In one embodiment, the at least one wear indicator defines a feature or a protuberance of the tread conditioning insert rather than (or in addition to) the composition friction material. The feature may include a trigonal or triangular feature. The triangular feature may have a maximum height of at least about 10 millimeters. The trigonal feature may have a maximum height of about 10 millimeters. The trigonal feature may have a maximum width of at least about 10 millimeters. In another embodiment, the trigonal feature may have a maximum width of about 10 millimeters. The feature may include a rectangular feature. The rectangular feature may have a length of at least about 20 millimeters. In another embodiment, the rectangular feature may have a length of less than about 20 millimeters. The rectangular feature may have a height of at least 2 millimeters. In another embodiment, the rectangular feature may have a height of 2 millimeters. The feature may have a circular cross sectional profile. The circular feature may have a diameter of at least about 10 millimeters. In another embodiment, the circular feature may have a diameter of less than about 10 millimeters. In on embodiment, the circular feature is threaded, and in such an embodiment the wear indicator may be correspondingly threaded to be received within an aperture of, and be threadly coupled to (e.g., connected using threads), the conditioning insert.

In one embodiment, the wear indicator may extend the entire width of the main body part at the opposing end. The wear indicator has a height and a depth and may extend into the brake pad to a set vertical position on the opposing end with respect to the underside of the backing plate. The wear indicator should extend sufficiently to allow a technician to observe, by comparison, whether a desired thickness (i.e., height) of brake pad remains on the brake shoe. In examples, the depth to which the wear indicator extends into the opposing end of the brake pad may be sufficient to allow a technician to observe, by comparison, whether a desired thickness (i.e., height) of brake pad remains on the brake shoe. A technician preferably may view the height of brake pad remaining on the main body part of the brake shoe. In examples, the height and depth together of the wear indicator may allow a technician to judge the thickness of remaining brake pad on the main body part of a brake shoe when examining the brake shoe from a lateral side, and/or an opposing end on which the wear indicator is disposed.

The set vertical position to which the wear indicator extends may correspond to a replacement or condemning limit 550 of the brake pad. As used herein, a condemning limit is the minimum thickness of brake pad desired, or a distance between the back of the brake pad and the brake shoe's working surface. The formation of the wear indicator into the backing plate may not interfere with the use of a rejection lug 560. In other embodiments, different configurations of rejections lugs may be used with such configurations determined, at least in part, on the corresponding attachment points of the brake system. Suitable rejection lugs may be oriented in parallel to the length of the brake shoe, or in some embodiment they may be perpendicular to the brake shoe length.

When a tread conditioning insert is present in an embodiment, the conditioning insert may be formed of a hardened material. Suitable hardened materials may include metal, ceramic, cermet, polymeric composites and the like. Suitable metals may include types of iron. Suitable irons may be ductile iron or cast iron. In some examples, the conditioning insert may be disposed inside the brake pad with the main body part. Further, grooves and/or protrusions may be formed in the brake pad proximally to the insert. However, some embodiments of the brake shoe according to the disclosure may not include a tread conditioning insert and/or grooves or protrusions formed proximally to the tread conditioning insert. In other embodiments, brake shoes may not include an insert and/or a flange. If a flange is present in the embodiment, the flange may extend from a side edge of the backplate. During use, the flange may ride over a portion of the wheel to maintain alignment.

In one embodiment, the conditioning insert has a weight, and the composition friction material has a weight. The weight of the insert relative to a weight of the composition friction material in the brake shoe may be in a range of from about 59% to about 90% by weight. In alternative embodiments the ratio of insert to composition friction material is less than 50% of the weight of the composition material. In one embodiment, the ratio is in a range of from about 51% to about 58% of the insert relative to the composition friction material. Alternatively, the ratio of weights may be in a range that is greater than about 91%. The ratio of weights may be selected with reference to one or more of desired performance, expected life, type of materials, end use parameters, makeup of the material (e.g., voids, inclusions, solid and homogeneous) and densities of materials. For example, it may be desirable to alter a density of the composition friction material by adding a filler (powder, flake, granules, whiskers, fibers, and the like) that includes the same material, or a similar material, to the material that forms the conditioning insert. Such an addition would make the average weights closer to each other. Conversely, adding relatively heavier, lighter, denser or less-dense fillers may allow for tailoring of the ratio of weights.

A suitable conditioning insert has a total weight that can be subdivided into the percent of the conditioning insert that is used during the life of the brake shoe and the percent that is 'left over' after the condemning limit is reached. At the beginning of service, or at the end of service, the brake shoe may have a ratio of useful or working conditioning insert portion to the non-working portion that is in a range of from about 59% to about 90% by weight. In alternative embodiments the ratio of working conditioning insert portion to the non-working portion is less than 50% of the weight of the composition material. In one embodiment, the ratio is in a range of from about 51% to about 58% of the working conditioning insert portion to the non-working portion. Alternatively, the ratio of weights may be in a range that is greater than about 91%. The ratio of weight may be selected with reference to one or more of desired performance, end use parameters, and density or type of material. For example, it may be desirable to have a different ratio if mild steel is used in place of cast iron, or if aluminum alloy is used rather than a ductile iron material.

In one embodiment, the conditioning insert has a work surface and the composition friction material that forms the brake pad has a work surface. These combined work surfaces may form a combined total work surface area. The ratio of surface areas of the insert, or inserts, to the friction composition material may be in a range of less than about 4%. In one embodiment, a suitable ratio of work surface areas may be in a range of from about 5% to about 10%, in a range of from about 11% to about 20%, from about 21% to about 30%, from about 31% to about 40%, or in a range that is greater than about 41%. The ratio may be selected based on factors that include one or more of the end use application, the materials that form the insert, the materials that form the friction composition material, the vehicle type, the brake type, and the like. As with the weight ratios, the surface area ratios may be calculated at the beginning of service life, the end of service life, an average during the life of, and at discrete points during the life (such as the mid-point).

In one embodiment, the conditioning insert is welded to the backing plate. In another embodiment, the conditioning insert is mechanically coupled to the backing plate. In one embodiment, the conditioning insert is integrally formed with the backing plate so that it is a monolithic structure having no seams or welds or fasteners. The backing plate may have a curved profile that follows a curve of a wheel, disk, drum or other brake component with which the working surface of the brake pad may contact during operation. The brake pad's working surface, too, may have a curved profile that matches a curved surface with which it must contact to operate. The curved profiles of the backing plate relative to the working surface may be coaxial in one embodiment. In alternative embodiments the curved profiles may differ from each other. The thickness of the backing plate may differ from embodiment to embodiment, as well. A thicker backing plate may offer additional stiffness that is desirable for some end use applications. Alternatively, a thinner backing plate may be used having, for example, stiffing ribs that may achieve a similar stiffness characteristic of the backing plate but with a thinner profile. A thinner profile may reduce material, and therefore cost, and may aid in thermal transfer and heat dissipation, however, adding ribs or the like may increase manufacturing complexity or costs. These costs may be avoided or minimized using additive manufacturing technology or other advanced manufacturing techniques.

As noted, the brake shoe for use on a railway vehicle may include the backing plate adapted to interface with a brake head on the railway vehicle, a composition friction material disposed onto the backing plate to form a brake surface of the brake shoe for engaging the wheel of the railway vehicle, the composition friction material may include two opposing ends and two opposing lateral sides, and at least one wear indicator chamfered into the composition friction material to form a chamfered surface on at least one of the two opposing ends and an extending surface extending lengthwise beyond the chamfered surface, the chamfered surface and the extending surface defining an obtuse angle. The obtuse angle may be greater than at least 102 degrees. In one embodiment, the obtuse angle may be less than about 132 degrees. In one embodiment, the obtuse angle may be 117 degrees. In one embodiment, the obtuse angle may be 115 degrees. In one embodiment, the obtuse angle may be 119 degrees. The extending surface mat be positioned vertically at a condemning limit and thus act as a wear indicator.

The brake pad disposed on the main body part may include two opposing lateral sides and two opposing ends. The brake pad may be disposed on a flange and may be single or dual flanged. Examples of brake shoe may include at least one tread conditioning insert disposed within the brake pad, which may include a wheel conditioning surface which forms a working surface with the brake surface of the brake shoe that contacts the wheel during braking operations. The tread conditioning insert is ideally formed of a hardened material, such as cast iron, but may be formed of any suitable material having abrasive properties. In examples, the tread conditioning insert is disposed on the brake pad disposed on the main body part. Further, as shown, grooves may be formed in the brake pad proximally to the insert. However, examples of the brake shoe according to the present disclosure may not include a tread conditioning insert and/or grooves formed proximally to the tread conditioning insert. An embodiment is applicable to examples of brake shoes that do not include an insert, and/or include a flange, as well.

Figure 6:
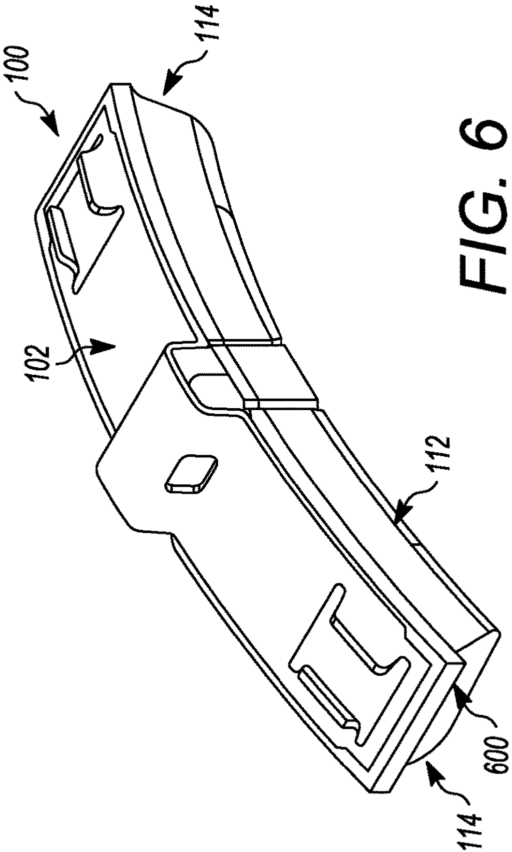
FIG. 6 is a perspective view of the brake shoe shown in FIG. 5.
Figure 7:
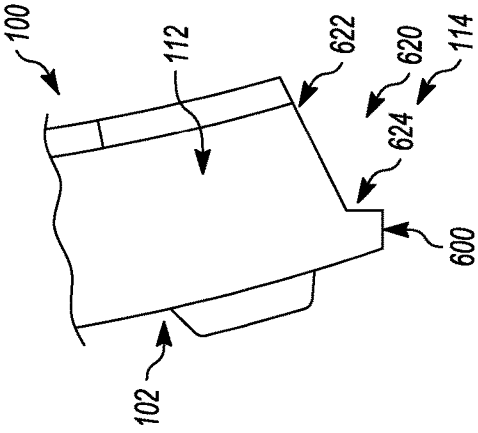
FIG. 7 is an enlarged partial view of the brake shoe shown in FIG. 5.
Figure 5:
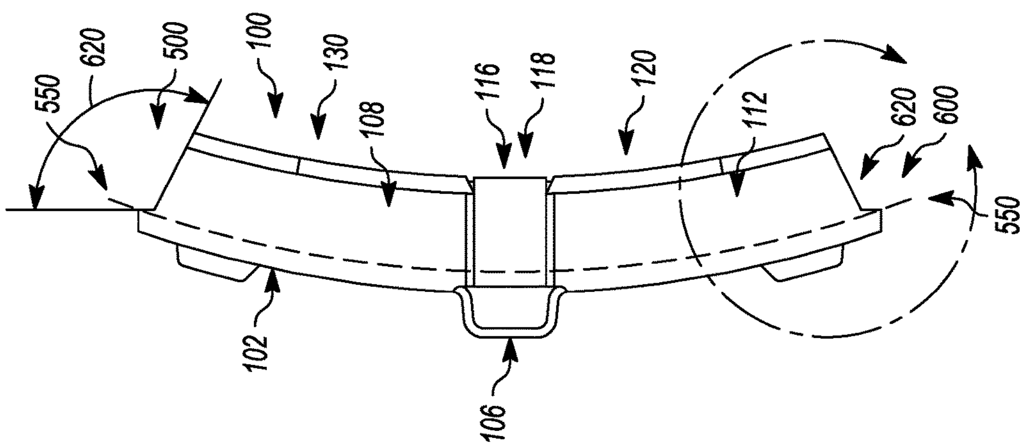
FIG. 5 is a side view of a brake shoe according to an embodiment of the invention.

With reference to FIGS. 5-7, the brake shoe may include at least one wear indicator 600 that is chamfered into the brake pad on at least one of the two opposing ends and forming a chamfered surface 622 on the at least one opposing end. The chamfer may form an extending surface 624, which extends lengthwise beyond the chamfered surface. Together, the chamfered surface and the extending surface define an obtuse angle 620, the vertex of which may be positioned at the intersection of the chamfered surface and the extending surface. The extending surface may be vertically positioned at a determined level. A suitable determined level of the extending surface vertical position may be at a condemning limit of the brake shoe. In the illustrated embodiment, the obtuse angle is at 117 degrees. In another embodiment, the obtuse angle may be in a range of from about 100 degrees to about 105 degrees, in a range of from about 106 degrees to 115 degrees, in a range of from about 116 degrees to 125 degrees, in a range of from about 126 degrees to 130 degrees, or greater than about 130 degrees. In one embodiment, the obtuse angle may be less than about 100 degrees. The obtuse angle selection may impact performance. The obtuse angle may be selected with reference to desired operating characteristics and end use parameters. In one embodiment, the end surface may be faceted so that multiple obtuse angles may be present, with the extending surface remaining consistent to identify the location of the condemning limit. In an alternative embodiment, there are plural extending surfaces on an end of the brake pad, with each having a determined location relative to the condemning limit and a determined obtuse angle. In another alternative embodiment, there are plural obtuse angles, with each end of the brake pad having a different selected obtuse angle.

The chamfer may span from one lateral side to the opposing lateral side of the main body part. As a result, a technician may observe the wear indicator when examining the brake shoe from a lateral side, and/or an opposing end on which the wear indicator is disposed, in order to judge the thickness of remaining brake pad on the main body part of a brake shoe by comparison with the thickness of the brake pad to the extending surface portion. In one embodiment, the backing plate may extend over and above the chamfered surface and the extending surface.

Figure 8:
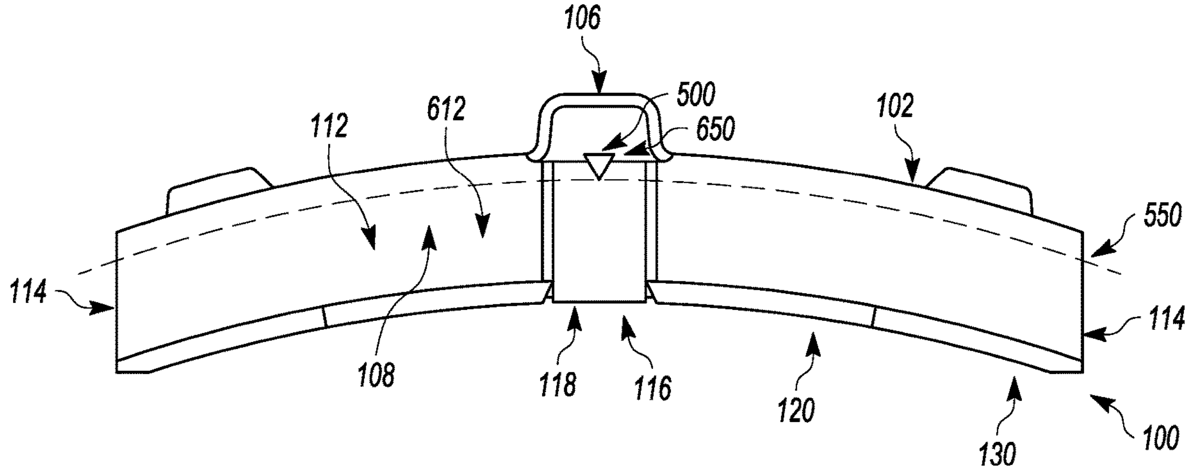
FIG. 8 is a side view of a brake shoe according to an embodiment of the invention.
Figure 9:
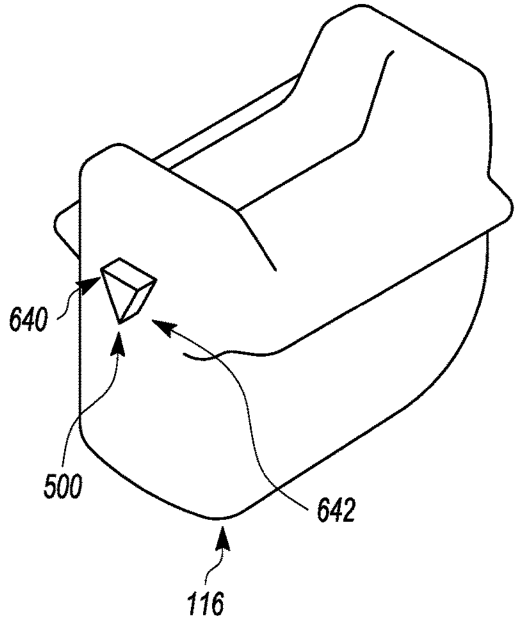
FIG. 9 is a partial perspective view of the brake shoe of FIG. 8.

With reference to FIGS. 8 and 9, the illustrated embodiment includes a flange and a wear indicator 640 that is disposed on a lateral side 612 of the brake shoe that is opposite the flange side of the brake shoe. Examples of the wear indicator may include a protrusion 640 from a conditioning insert. The wear indicator may be formed as a part of the tread conditioning insert, which is centrally located. The protrusion formed, and extending, from the tread conditioning insert may be at a set vertical position relative to the wear limit. It may extend through the brake pad material and out from the surface of the brake pad. In the illustrated embodiment, the protruding wear indicator is prismatic shaped or has a trigonal cross sectional profile. The “point” of triangle can be oriented relative to the working surface of the brake pad. In the illustrated embodiment, the wear indicator is oriented such that the point is towards the working surface. In other embodiments the point may be oriented away from the working surface or skewed relative to the working surface. Further, the wear indicator is shown with a relatively uniform width. Alternative embodiments may have the wear indicator taper, and can be, for example, thicker at the base to provide additional stability. In embodiments where the wear indicator is not monolithic with the conditioning insert (but rather is coupled thereto) such tapering may be useful to secure the coupling.

Alternatively, a wear indicator may extend from the insert to be flush with the end surface of the brake pad (and not extend further than the brake pad surface. In this alternative configuration the brake pad must be worn down to the condemning limit for the wear indicator to be visible. Although this alternative embodiment is functional, it provides little to no insight to an observer of how much brake pad is left before the condemning limit is reached. One variation on this alternative embodiment is to have the wear indicator protrusion angle out from the tread conditioner such that the wear indicator exposes more of itself before the full wear indicator is exposed. An observer would then be able to calculate how much brake pad is left without having achieved a wear profile that fully exposes the wear indicator (and having hit the condemning limit).

In examples, the wear indicator initially may be uncovered by brake pad, partially or totally covered with a layer of brake pad, so long as the wear indicator is visible to a technician during inspection when the brake pad is worn to the condemning limit. In alternative embodiments, the protrusion may be formed from the brake pad material itself.

In embodiments in which there are plural conditioning inserts (not shown) these conditioning inserts may be disposed non-centrally. For example, there may be a first conditioning insert disposed at one end of the brake pad and a second conditioning insert disposed at the opposing end of the brake pad. One or both of these conditioning inserts may have a protruding wear indicator feature that extend outward from the conditioning insert through the brake pad and outward further from an end 114 of the brake pad at the vertical set limit that corresponds to the condemning limit of the brake pad. When the brake pad has worn down to be flush with the top (or depending on the embodiment, some other portion) of the protrusion the observer knows that the brake pad has worn down to the condemning limit and should be replaced.

Figure 10:
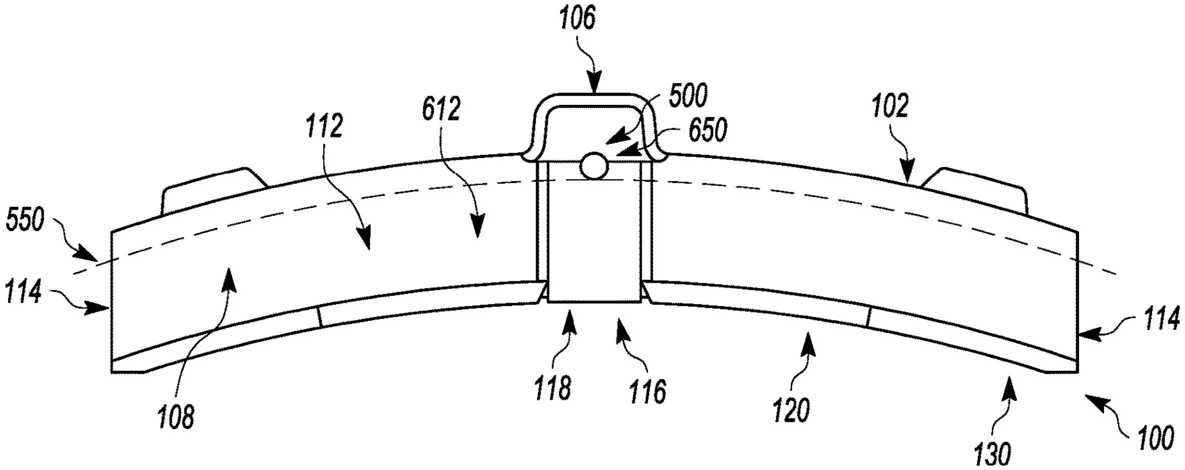
FIG. 10 is a side view of a brake shoe according to an embodiment of the invention.
Figure 11:
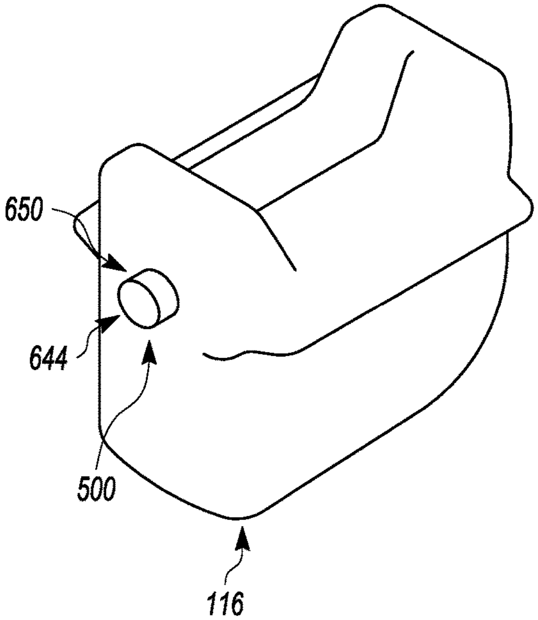
FIG. 11 is a partial perspective view of the brake shoe of FIG. 10.

With reference to FIGS. 10 and 11, the illustrated embodiment includes a flange and a wear indicator 650 that is disposed on the lateral side 612 of the brake shoe that is opposite the flange side of the brake shoe. Examples of the wear indicator may include a protruding rod (the wear indicator 650) that is affixed to and extends from a conditioning insert, which is centrally located in this embodiment. The wear indicator may be at a set vertical position relative to the wear limit, and it may extend from the conditioning insert through the brake pad material and out from the surface of the brake pad. In the illustrated embodiment, the protruding wear indicator is rod shaped and may be threaded along all or a portion of its length. The material of the wear indicator may differ from the material of the conditioning insert. In other embodiments, it may be the same material. In this embodiment, it is a standard steel grade commonly used for bolts. Further, the wear indicator is shown with a relatively uniform width. Alternative embodiments may have the wear indicator taper, and can be, for example, thicker at the base to provide additional stability. In embodiments where the wear indicator is not monolithic with the conditioning insert (but rather is coupled thereto) such tapering may be useful to stabilize the coupling therebetween.

In one alternative embodiment, the wear indicator extends from the conditioning insert laterally along the length of the brake shoe body to protrude from one of the opposing ends of the brake shoe. In one embodiment, the wear indicator extends through the entirety of the length of the brake shoe and protrudes from both of the opposing end surfaces. In this way, the conditioning insert may have an aperture through which the wear indicator may pass. In alternative embodiments in which the conditioning insert is one of a plurality of conditioning inserts or is (or has) at least one non-centrally disposed body, the wear indicator may extend from a conditioning insert that is proximate to an end of the brake shoe and may protrude from a surface of that end (rather than from a lateral or flange side of the brake shoe).

Figure 12:
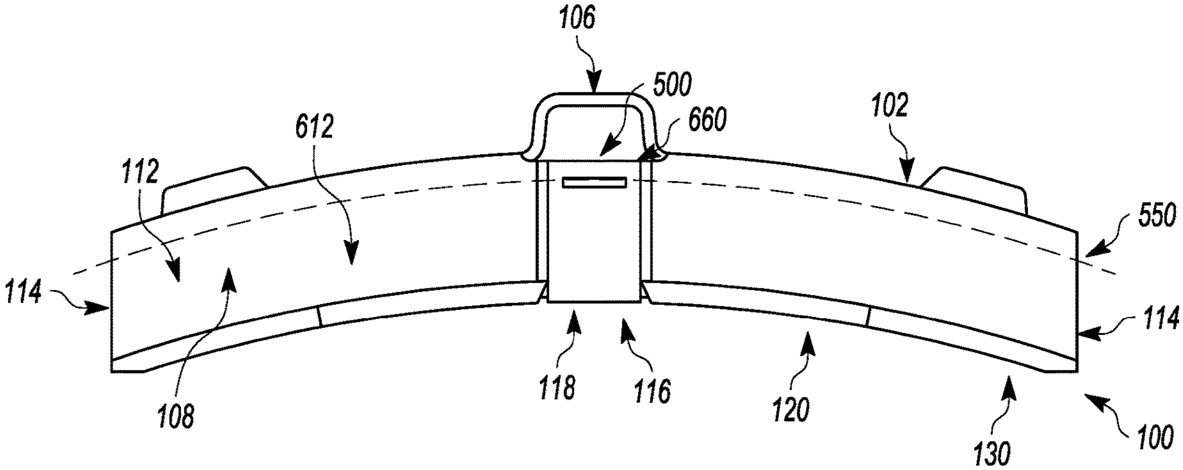
FIG. 12 is a side view of a brake shoe according to an embodiment of the invention.
Figure 13:
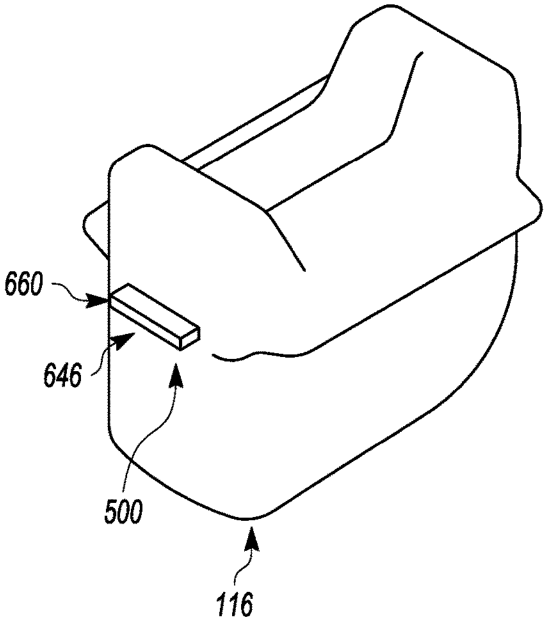
FIG. 13 is a partial perspective view of the brake shoe of FIG. 12.

With reference to FIGS. 12 and 13, the illustrated embodiment shows a wear indicator 660 that is disposed on a lateral side of the brake shoe that is opposite the flange side of the brake shoe. Examples of the wear indicator may include a tab 660 extending from a conditioning insert. The wear indicator may be formed as a part of the tread conditioning insert, which is centrally located. The protrusion formed, and extending, from the tread conditioning insert may be at a set vertical position relative to the wear limit. It may extend through the brake pad material and out from the surface of the brake pad. In the illustrated embodiment, the protruding wear indicator is a flat elongate tab with a generally rectangular cross sectional profile. A “flat edge” of tab can be oriented relative to the working surface of the brake pad. In the illustrated embodiment, the wear indicator is oriented such that a flat edge is towards the working surface. In other embodiments the point may be oriented away from the working surface or skewed relative to the working surface. Further, the wear indicator is shown with a relatively uniform width. Alternative embodiments may have the wear indicator taper, and can be, for example, thicker at the base to provide additional stability. In embodiments where the wear indicator is not monolithic with the conditioning insert (but rather is coupled thereto) such tapering may be useful to secure the coupling.

A width and thickness of the tab wear indictor may be selected based on end use parameters. Factors that may inform the selection may include the type of material used to form the wear indicator (particularly if it differs from the conditioning insert), the type of material of the brake pad, the expected service speed of the vehicle, the required stopping power expected from the brake shoe, the expected thermal environment associated with the brake shoe usage, and so on. Prior to indicating that the condemning limit has been reached, the wear indicator (as in other embodiments) may aid in the dissipation of heat generated during use in which the conditioning insert is heated. Because the conditioning insert, and likely the wear indicator, may be metal they are good conductors of heat relative to the brake pad material itself. A wider tab wear indicator may aid in heat dissipation relative to a smaller one.

In one embodiment, the present disclosure describes a brake shoe that includes a backing plate, a composition friction material forming a brake pad, and at least one wear indicator. The backing plate is adapted to interface with a brake head on the railway vehicle that has at least one wheel. The composition friction material forming the brake pad that has i) a back surface disposed onto the backing plate and a brake surface of the brake pad for engaging the wheel of the railway vehicle, the brake pad having first and second opposing ends and first and second opposing lateral sides, each of the ends and each of the sides having a respective surface. The at least one wear indicator is formed in at least one of the two opposing ends proximate to an intersection of the back surface and at least one of the first end surface, the second end surface, the first lateral side surface and the second lateral side surface, and the wear indicator extends outwards from at least one of the first end surface, the second end surface, the first lateral side surface and the second lateral side surface at a set vertical position with respect to the back surface.

Optionally, the set vertical position is coextensive with a condemning limit of the brake shoe. Optionally, the wear indicator is monolithic with the brake pad and is also formed from the composition friction material. Optionally, the wear indicator extends outwards from the at least one of the first end surface and the second end surface. Optionally, the wear indicator extends outwards from the at least one of the first lateral side surface and the second lateral side surface. Optionally, the wear indicator has a width that is in a range of from about 20 millimeters wide to about 75 millimeters wide. In one embodiment, the wear indicator is about 40 millimeters wide. Optionally, the wear indicator extends outwards from at least one of the first end surface, the second end surface, the first lateral side surface and the second lateral side surface by about 10 millimeters.

Optionally, the at least one of the first end surface and the second end surface form a chamfered surface with a surface of the wear indicator, the chamfered surface and the surface of the wear indicator defining an obtuse angle. Optionally, the obtuse angle is in a range of from about 100 degrees to about 135 degrees. Optionally, the obtuse angle is 117 degrees.

In one embodiment, the brake shoe further includes a conditioning insert that is monolithic with or that is coupled to the wear indicator. Optionally, the wear indicator extends from the conditioning insert and protrudes from the first lateral side surface, the second lateral side surface or both the first and second lateral side surfaces of the brake pad. Optionally, the conditioning insert is one of a plurality of conditioning inserts, and the plurality of conditioning inserts comprises a first conditioning insert disposed within the brake pad proximate to a first end and a second conditioning insert disposed within the brake pad and proximate to the second end, and the wear indicator is monolithic with or coupled to the first conditioning insert. Optionally, the wear indicator extends from at least one of the plurality of conditioning inserts and protrudes from the first end surface, the second end surface or both the first and second surfaces of the brake pad. Optionally, the wear indicator is threaded and is threadedly coupled to a conditioning insert. Optionally, the wear indicator is a tab having a height, length and width and the width is greater than the height, the length is sufficiently long to extend outward from the at least one of the first end surface, the second end surface, the first lateral side surface and the second lateral side surface, and the width is greater than 5 millimeters. Optionally, the tab conducts thermal energy generated during use of the brake pad away from a working surface of the brake pad. Optionally, the composition friction material is a low-dust producing material. Optionally, the wear indicator is a monolithic extension of a conditioning insert that protrudes or extends from an end surface or a side surface of the brake pad, an extending surface of the wear indicator is aligned with a condemning limit of the brake pad, and the wear indicator has a contrasting color relative to the brake pad.

For the purposes of the description, the terms "upper," "lower," "right," "left," "vertical," "horizontal," "parallel," "perpendicular," "top," "bottom," and derivatives and equivalents thereof shall relate to the invention as it is oriented in the drawing figures. The term "length," and derivatives thereof refer to the longest dimension of the invention, as shown in the drawing figures. The term "depth" and derivatives thereof when applied to a dimension of the wear indicator refer to the "length" direction. The term "height" and derivatives thereof refer to the vertical dimension of the invention, as shown in the drawing figures. The term "width," and derivatives thereof refer to the dimension of the invention that is perpendicular to both height and length. The terms "vertical," "horizontal," "parallel," "perpendicular," and derivatives and equivalents thereof are approximate.

The singular forms "a", "an", and "the" include plural references unless the context clearly dictates otherwise. "Optional" or "optionally" means that the subsequently described event or circumstance may or may not occur, and that the description may include instances where the event occurs and instances where it does not. Approximating language, as used herein throughout the specification and claims, may be applied to modify any quantitative representation that could permissibly vary without resulting in a change in the basic function to which it may be related. Accordingly, a value modified by a term or terms, such as "about," "substantially," and "approximately," may be not to be limited to the precise value specified. In at least some instances, the approximating language may correspond to the precision of an instrument for measuring the value. Here and throughout the specification and claims, range limitations may be combined and/or interchanged, such ranges may be identified and include all the sub-ranges contained therein unless context or language indicates otherwise.

This written description uses examples to disclose the embodiments, including the best mode, and to enable a person of ordinary skill in the art to practice the embodiments, including making and using any devices or systems and performing any incorporated methods. The numbered claims define the patentable scope of the disclosure, and include other examples that occur to those of ordinary skill in the art. Such other examples are intended to be within the scope of the claims if they have structural elements that do not differ from the literal language of the claims, or if they include equivalent structural elements with insubstantial differences from the literal language of the claims.

What is claimed is:

1. A brake shoe, comprising:

a backing plate adapted to interface with a brake head on a vehicle;

a brake pad formed from a composition friction material, the brake pad having a back surface disposed onto the backing plate and a brake surface of the brake pad, the brake pad having opposite first and second ends and opposite first and second lateral sides; and at least one wear indicator formed from the composition friction material, the at least one wear indicator formed in at least one of the first end or the second end of the brake pad proximate to an intersection of the back surface and the surface of at least one of the first end, the second end, the first lateral side, or the second lateral side of the brake pad, the at least one wear indicator projecting from at least one of the first end, the second end, the first lateral side, or the second lateral side at a set vertical position with respect to the back surface of the brake pad, wherein the surface of at least one of the first end or the second end forms a chamfered surface with an extending surface of the at least one wear indicator that outwardly projects from the at least one of the first end or the second end, the chamfered surface and the extending surface of the at least one wear indicator defining an obtuse angle.

2. The brake shoe according to claim 1, wherein the obtuse angle is in a range of from about 100 degrees to about 135 degrees.

3. The brake shoe according to claim 2, wherein the obtuse angle is 117 degrees.

4. The brake shoe according to claim 1, further comprising a conditioning insert that is monolithic with or that is coupled to the at least one wear indicator.

5. The brake shoe according to claim 4, wherein the at least one wear indicator extends from the conditioning insert and protrudes from the surface of the first lateral side, the surface of the second lateral side, or the surfaces of both the first and second lateral sides of the brake pad.

6. A brake shoe, comprising:

a backing plate adapted to interface with a brake head on a vehicle that has at least one wheel;

a brake pad formed from a composition friction material and having a back surface disposed onto the backing plate and a brake surface of the brake pad for engaging the wheel of the vehicle, the brake pad having opposite first and second ends and opposite first and second lateral sides, each of the ends and each of the sides having a respective surface;

at least one wear indicator formed from the composition friction material in at least one of the first end or the second end of the brake pad proximate to an intersection of the back surface and the surface of at least one of the first end, the second end, the first lateral side, or the second lateral side of the brake pad, the at least one wear indicator projecting from the surface of at least one of the first end, the second end, the first lateral side, or the second lateral side of the brake pad at a set vertical position with respect to the back surface; and a conditioning insert that is monolithic with or that is coupled to the at least one wear indicator, wherein the at least one wear indicator is threaded and is threadedly coupled to the conditioning insert.

7. The brake shoe according to claim 6, wherein the at least one wear indicator is a tab having a height, length, and width with the width being greater than the height, the length is sufficiently long to extend outward from the surface of at least one of the first end, the second end, the first lateral side, or the second lateral side, and the width is greater than 5 millimeters.

* * * * *